(12) United States Patent
Brown

(10) Patent No.: US 7,066,365 B2
(45) Date of Patent: Jun. 27, 2006

(54) TRANSPORTABLE SHOOTING APPARATUS

(76) Inventor: Michael S. Brown, 1599 Manitou Rd., Rochester, NY (US) 14626

( * ) Notice: Subject to any disclaimer, the term of this patent is extended or adjusted under 35 U.S.C. 154(b) by 378 days.

(21) Appl. No.: 10/426,267

(22) Filed: Apr. 30, 2003

(65) Prior Publication Data

US 2003/0205599 A1 Nov. 6, 2003

Related U.S. Application Data

(60) Provisional application No. 60/376,863, filed on May 1, 2002.

(51) Int. Cl.
*B60R 7/00* (2006.01)

(52) U.S. Cl. .................. 224/401; 224/519; 224/525; 42/94

(58) Field of Classification Search ........... 224/401, 224/529, 525, 455, 282, 572, 521, 495, 524; 42/94
See application file for complete search history.

(56) References Cited

U.S. PATENT DOCUMENTS

| | | | | | |
|---|---|---|---|---|---|
| 2,486,161 | A | * | 10/1949 | Hughes | 280/502 |
| 3,220,766 | A | * | 11/1965 | Kates | 297/184.16 |
| 3,528,578 | A | * | 9/1970 | Schoenberger | 414/462 |
| 3,794,227 | A | * | 2/1974 | Stearns | 224/532 |
| 4,614,252 | A | * | 9/1986 | Tarner | 182/116 |
| 4,630,993 | A | * | 12/1986 | Jensen | 415/58.7 |
| 4,937,965 | A | * | 7/1990 | Narvaez | 42/94 |
| 4,951,991 | A | * | 8/1990 | Haigler | 296/26.09 |
| 5,347,740 | A | * | 9/1994 | Rather et al. | 42/94 |
| 5,397,147 | A | * | 3/1995 | Ducharme et al. | 280/415.1 |
| 5,458,389 | A | * | 10/1995 | Young | 296/26.08 |
| 5,836,494 | A | * | 11/1998 | Grunsted et al. | 224/521 |
| 5,974,719 | A | * | 11/1999 | Simonek | 42/94 |
| 6,105,721 | A | * | 8/2000 | Haynes | 182/127 |
| 6,269,578 | B1 | * | 8/2001 | Callegari | 42/94 |
| 6,336,413 | B1 | * | 1/2002 | Ball | 108/44 |
| 6,378,748 | B1 | * | 4/2002 | Cox | 224/511 |
| 6,382,484 | B1 | * | 5/2002 | Savant | 224/401 |
| 6,502,730 | B1 | * | 1/2003 | Johnson | 224/519 |
| 6,502,771 | B1 | * | 1/2003 | Wyne | 239/663 |
| 6,604,606 | B1 | * | 8/2003 | McDougal et al. | 182/127 |
| 6,662,983 | B1 | * | 12/2003 | Lane et al. | 224/405 |
| 6,684,550 | B1 | * | 2/2004 | Highfill | 42/94 |
| 6,808,231 | B1 | * | 10/2004 | Hill | 297/217.7 |
| 6,814,503 | B1 | * | 11/2004 | Hall et al. | 385/91 |
| 6,871,440 | B1 | * | 3/2005 | Highfill et al. | 42/94 |
| 2002/0197466 | A1 | * | 12/2002 | Ueno et al. | 428/322.2 |
| 2004/0164112 | A1 | * | 8/2004 | McClain et al. | 224/401 |
| 2004/0237372 | A1 | * | 12/2004 | Frye | 42/94 |

OTHER PUBLICATIONS

No Author or Title. Cabela's Master Catalog Spring 2003 Edition I. Cabela's Inc. Sydney, Nebraska. p. 347, Items CD-22-2259-127 Post Mount and CD-22-3856 Post Mount 3//4 cock.

* cited by examiner

*Primary Examiner*—T. Mai
(74) *Attorney, Agent, or Firm*—Patent Innovations LLC; John M. Hammond

(57) ABSTRACT

An apparatus, which can be secured to a vehicle, and which can be used to affix, transport, and deploy shooting sports equipment such as a target dispenser, or a gun-sighting bench rest assembly. The apparatus is most commonly secured to and transported by an all-terrain vehicle.

10 Claims, 8 Drawing Sheets

TRANSPORTABLE SHOOTING APPARATUS

CROSS-REFERENCE TO RELATED PATENT APPLICATIONS

This application claims the benefit of the filing date of U.S. provisional patent application Ser. No. 60/376,863 filed May 1, 2002.

This invention relates generally to outdoor shooting sports, and more particularly to an apparatus for dispensing shooting targets, and an apparatus for measurement and calibration of gun sights.

BACKGROUND AND SUMMARY OF THE INVENTION

The present invention is an apparatus, which can be secured to a vehicle, and which can be used to affix, transport, and deploy shooting sports equipment such as a target dispenser, a gun-sighting bench rest assembly, and the like.

Heretofore, a number of patents and publications have disclosed transportable apparatus, which attach to a vehicle, the relevant portions of which may be briefly summarized as follows:

U.S. Pat. No. 6,089,431 to Heyworth, issued Jul. 18, 2000, discloses a transportable hoist apparatus, which attaches to a receiver on a vehicle.

U.S. Pat. No. Des. 407,135 to DeWitt, issued Mar. 23, 1999, discloses a transportable clay pigeon launcher support device, which attaches to a receiver on a vehicle, and which comprises a square tube, and a rotatable platform.

U.S. Pat. No. 5,397,147 to Ducharme et al., issued Mar. 14, 1995, discloses a transportable work table apparatus, which attaches to a receiver on a vehicle, and which comprises a square tube, and a fixed platform.

U.S. Pat. No. 2,925,077 to Leubkeman, issued Feb. 16, 1960, discloses a target-dispensing device, which is attachable to a fixed object, such as a post.

In accordance with the present invention, there is provided an apparatus for affixing, transporting, and deploying shooting sports equipment with a vehicle, comprising: a receiver bar having a first end and a second end, the first end being attachable at to a vehicle; a riser comprising a lower section and an upper section, said riser being attachable at the lower section to the second end of said receiver bar; wherein the upper section of said riser further comprises a joining feature for affixing said shooting sports equipment to said riser.

In accordance with another aspect of the present invention, there is provided an apparatus for affixing, transporting, and deploying a target dispenser with a vehicle, comprising: a receiver bar having a first end and a second end, the first end being attachable to a vehicle; a riser having a lower section and an upper section, the lower section being attachable to the second end of said receiver bar; and a target dispenser attached to the upper section of said riser.

In accordance with another aspect of the present invention, there is provided an apparatus for affixing, transporting, and deploying a gun-sighting bench rest with a vehicle, comprising a receiver bar comprising a first end and a second end, attachable at said first end to a vehicle; a riser comprising a lower section and an upper section, attachable at said lower section to said second end of said receiver bar; and a gun-sighting bench rest attached to said upper section of said riser.

One aspect of the invention is based on the observation of problems with conventional techniques of affixing, transporting, and deploying shooting sports equipment in remote outdoor locations. To the best of the applicant's knowledge, no one single device offers the capability of effectively accomplishing all three objectives of affixing, transporting, and deploying equipment.

In many instances, it is desirable to transport such equipment into areas, which are substantially inaccessible with large vehicles and conventional equipment transporting means. The present invention enables fast and simple affixing of such equipment to a vehicle that is capable of accessing remote terrain, e.g. an all terrain vehicle. Furthermore, such equipment is frequently secured at the remote site to such objects as a vehicle spare tire and the like, as means to affix and immobilize the equipment. For example, the practice of attaching a target dispenser (used in dispensing skeet or trap shooting targets) to the spare tire of a vehicle (detached and lying on the ground) is generally unsatisfactory. A typical spare tire is not a satisfactory base, because it is not heavy enough to withstand the recoil of the target dispenser during target ejection, and thus it allows the dispenser to wobble uncontrollably during and after ejection. Any attempt to add weight to the spare tire, e.g. filling it with water, renders the spare tire generally unsatisfactory for its intended purpose.

The apparatus of the present invention can include a receiver bar, attachable to a vehicle; a riser, attachable to the receiver bar; and a joining feature for affixing shooting sports equipment to the riser.

The technique described above is advantageous because it enables fast and easy affixing of shooting sports equipment to a vehicle, ease of transportation of the equipment with the vehicle, and ease of deployment and use of the equipment upon arrival of the vehicle and equipment at the desired destination.

It is therefore an object of this invention to provide an apparatus for affixing, transporting, and deploying shooting sports equipment with a vehicle.

It is a further object of this invention to provide an apparatus for affixing, transporting, and deploying a target dispenser with a vehicle.

It is an additional object of this invention to provide an apparatus for affixing, transporting, and deploying a gun-sighting bench rest with a vehicle.

BRIEF DESCRIPTION OF THE DRAWINGS

The invention will be described by reference to the following drawings, in which like numerals refer to like elements, and in which.

Figure 1:
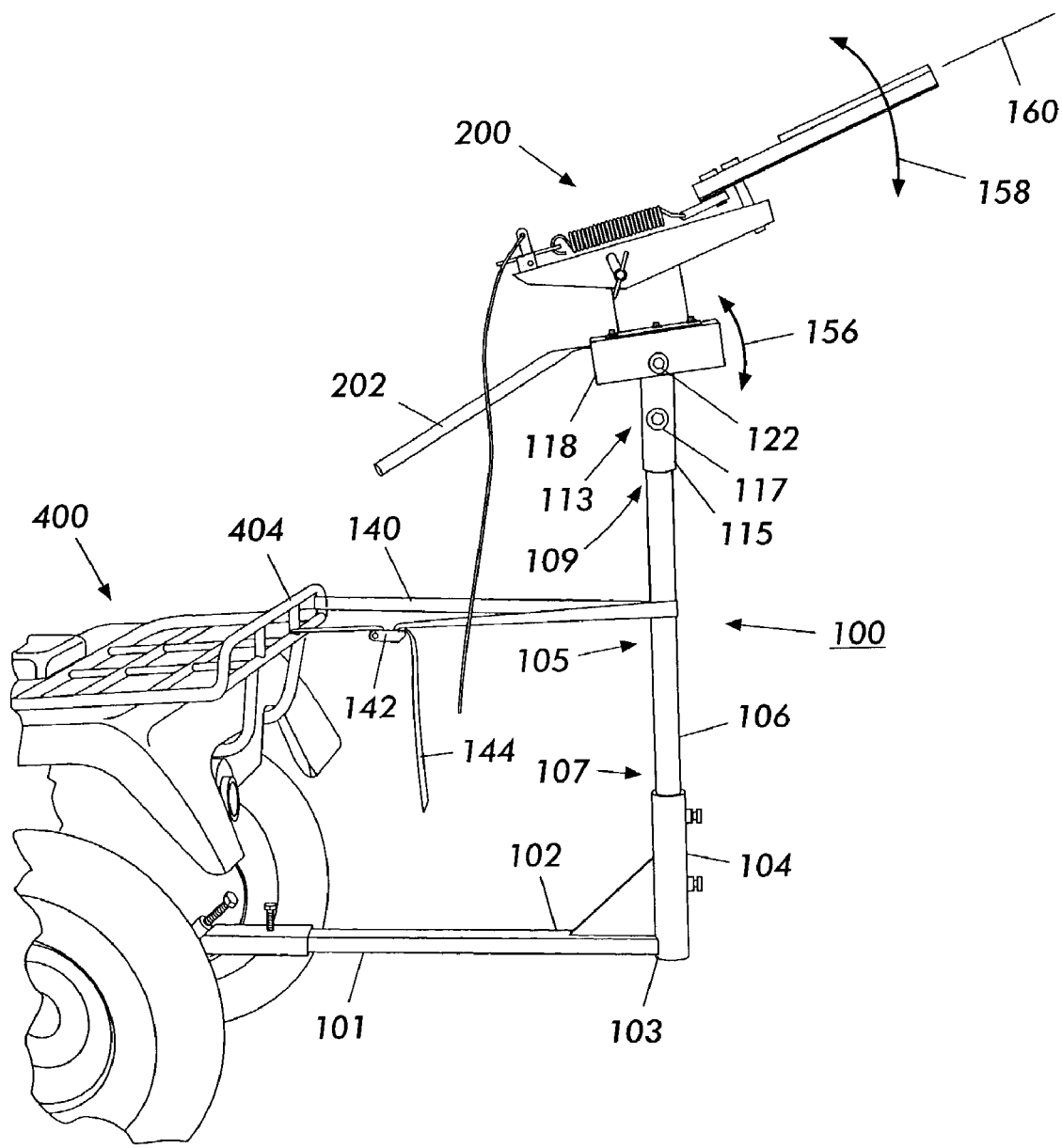
FIG. 1 is a side elevation view of one embodiment of the apparatus of the present invention, comprising a receiver bar, a riser, and a target dispenser.

The present invention will be described in connection with a preferred embodiment, however, it will be understood that there is no intent to limit the invention to the embodiment described. On the contrary, the intent is to cover all alternatives, modifications, and equivalents as may be included within the spirit and scope of the invention as defined by the appended claims.

DESCRIPTION OF THE PREFERRED EMBODIMENT

For a general understanding of the present invention, reference is made to the drawings. In the drawings, like reference numerals have been used throughout to designate identical elements. In describing the present invention, the following terms have been used in the description: A target dispensing device is meant to describe any device that can throw, fling, or otherwise discharge a target object into a spatial volume, where a shooter may discharge a firearm at such object while it is in flight. Such target dispensing devices are typically used in the practice of skeet and trap shooting, wherein such targets are typically substantially disc shaped, made of ceramic composition, and often referred to as clay pigeons. A firearm is meant to describe any gun in general. A long gun is meant to describe a firearm comprising a long-barrel (i.e. a barrel of a length more than approximately twenty times its outside diameter); and a stock which is generally placed against the shoulder of the shooter, such as a shotgun, a rifle, a muzzle-loader, and the like. A sidearm is meant to describe a firearm comprising a short barrel (i.e. a barrel of a length less than approximately ten times its outside diameter), and a stock which is generally gripped with one hand of the shooter, and which is carried in a side holster, or concealed and carried in a body holster. A sidearm may be e.g. a pistol, a handgun, a derringer, and the like. Gun sighting is meant to indicate the practice of aiming a firearm, or the practice of calibrating the alignment of the mechanical or optical means, which is provided proximate to a gun barrel to ensure the accuracy of a gunshot.

Referring to FIG. 1, and in one embodiment, the applicant's transportable shooting device 100 comprises receiver bar 102, and riser 105. Receiver bar 102 comprises a first end 101, which is attachable to vehicle 400, and a second end 103, which is attachable to riser 105. In one embodiment, end 103 of receiver bar 102 comprises riser sleeve 104, and riser 105 comprises a lower section 107, wherein the outside dimensions of lower section 107 and the inside dimensions of riser sleeve 104 are such that a sliding fit of lower section 107 inside of riser sleeve 104 is attained.

Figure 2:
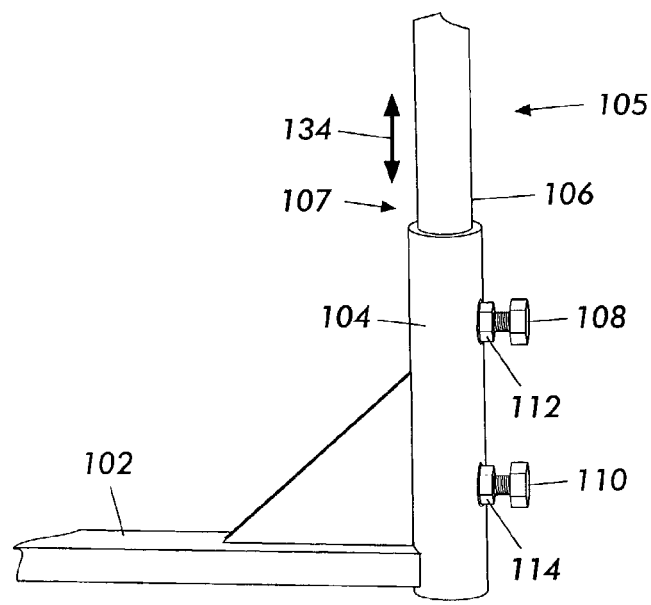
FIG. 2 is a side elevation view of means to attach the riser of the apparatus to the receiver bar of the apparatus.

FIG. 2 is a side elevation view of means to attach the riser 105 of the apparatus to the receiver bar 102 of the apparatus. Referring to FIG. 2, lower section 107 of riser 105 is engaged in riser sleeve 104. Riser sleeve upper locking bolt 108 and riser sleeve lower locking bolt 110 are threadedly engaged with riser sleeve upper locking nut 112 and riser sleeve lower locking nut 114 respectively. Riser sleeve locking bolts 108 and 110 extend through holes (not shown) in riser sleeve 104, such that the tips (not shown) of riser sleeve locking bolts 108 and 110 also engage the outer surface of lower section 107 of riser 105, when riser sleeve locking bolts 108 and 110 are tightened. Accordingly, riser 105 is immobilized and secured to receiver bar 102 when riser sleeve locking bolts 108 and 110 are tightened.

Riser sleeve upper locking nut 112 and riser sleeve lower locking nut 114 of FIG. 2 are joined to riser sleeve 104 preferably by welding. Riser sleeve upper locking nut 112 and riser sleeve lower locking nut 114 provide threads with which to engage riser sleeve locking bolts 108 and 110 to riser sleeve 104. Alternatively, if riser sleeve 104 is of sufficient wall thickness such that riser sleeve 104 may be tapped with threads, riser sleeve locking bolts 108 and 110 may be threadedly engaged directly with riser sleeve 104.

Figure 3:
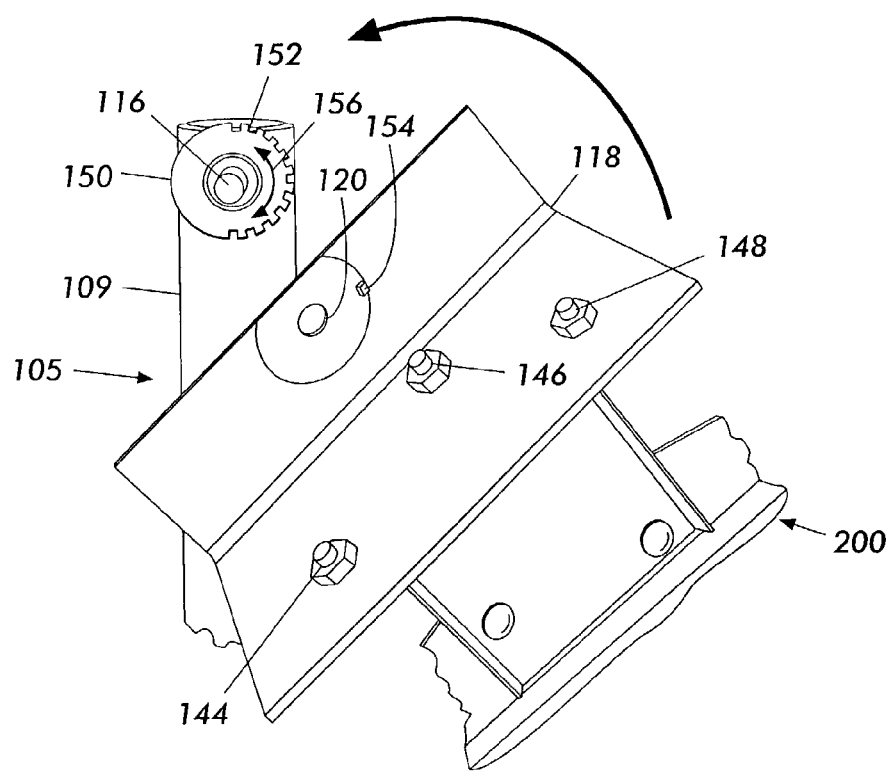
FIG. 3 is a detailed view of one joining feature for affixing equipment to the riser of the apparatus of the present invention.

Riser 105 further comprises a joining feature at the upper section 109 of riser 105. Referring to FIG. 3, and in one embodiment, riser 105 comprises stud 116, which is suitably joined to upper section 109 of riser 105. Stud 116 is preferably joined to upper section 109 of riser 105 by welding, brazing or equivalent joining methods. Alternatively, stud 116 may be threadedly engaged with upper section 109 of riser 105, into a correspondingly threaded hole (not shown) into upper section 109.

In one embodiment shown in FIG. 1, upper section 109 of riser 105 comprises a platform knuckle 113 having a sleeve 115, which fits over riser tube 106. Platform knuckle 113 further comprises threadedly engaged locking bolt and nut 117, which is used to secure platform knuckle 113 to riser tube 106, as was previously described for the securing of riser tube 106 within riser sleeve 104. Stud 116 (see FIG. 3) is joined to sleeve 115 of platform knuckle 113 as previously described.

Various shooting sports equipment, or other equipment may be attached to the joining feature at upper section 109 of riser 105. Referring again to FIG. 3, and in the embodiment in which said joining feature is stud 116, a platform 118 may be joined to the upper section 109 of riser 105. In FIG. 3 platform 118 comprises a short section of angle iron. Platform 118 is shown in FIG. 3 as detached from upper section 109 of riser 105, and inverted. To join platform 118 to upper section 109 of riser 105, platform 118 is turned over, and stud 116 is directed through hole 120 of platform 118. Referring to FIG. 1, platform 118 is shown joined to upper section 109 of riser 105, and secured with platform nut 122.

Figure 4:
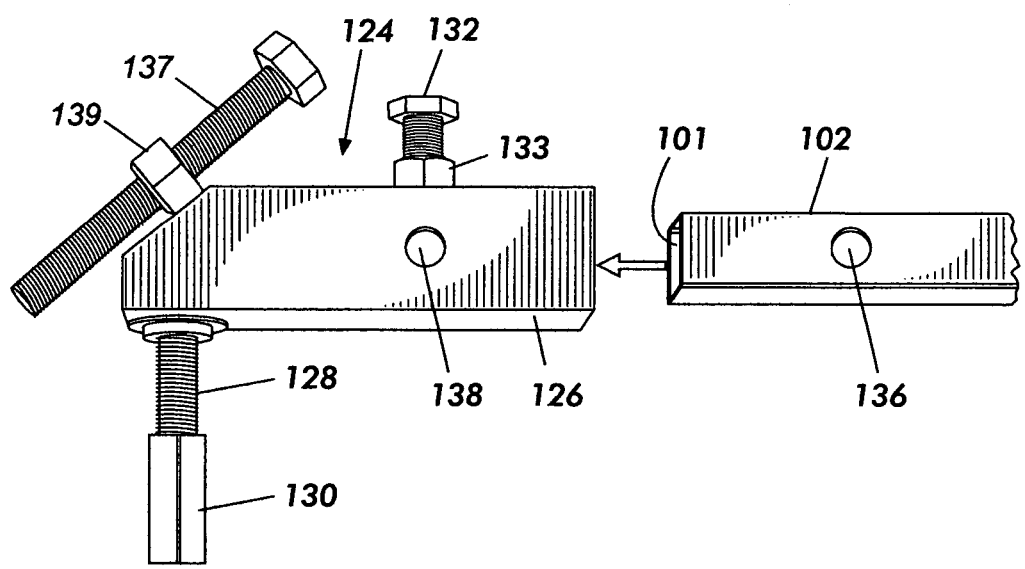
FIG. 4 is a side elevation view of receiver means for attaching the apparatus of the present invention to a vehicle.

In one embodiment, the apparatus of the present invention further comprises receiver means, which is suitably attached to the vehicle that is transporting the apparatus. FIG. 4 depicts receiver means for attaching the apparatus of the present invention to an all-terrain vehicle, which comprises a hitch plate 402 (see FIG. 5). Referring to FIG. 4, receiver means 124 comprises receiver socket 126, receiver stud 128, receiver nut 130, receiver lock bolt 132, and receiver lock nut 133.

Receiver socket 126 comprises a hollow cross section, and is typically fabricated from a short section of tubing. In one embodiment, receiver socket 126 is made of tubing having a square cross section. Receiver bar 102 comprises a square cross section, which achieves a sliding fit within receiver socket 126 when the end 101 of receiver bar 102 is engaged with receiver socket 126. Receiver locking bolt 132 is threadedly engaged with receiver locking nut 133, and with receiver bar 102, in the same manner in which riser tube lock bolt 108 is engaged with riser tube lock nut 112 (see FIG. 2), as previously described in this specification.

Referring again to FIG. 4, in a one embodiment, receiver bar 102 comprises a hole 136 drilled through the cross section thereof, and receiver socket 126 comprises a hole 138 drilled through the cross section thereof. When receiver bar 102 is engaged with receiver socket 126, a pin (not shown) may be inserted through the pair of aligned holes 136 and 138, thereby engaging receiver bar 102 with receiver socket 126. This method of engaging a receiver bar with a receiver socket is widely practiced in the art of automotive towing of trailers and the like.

Figure 5:
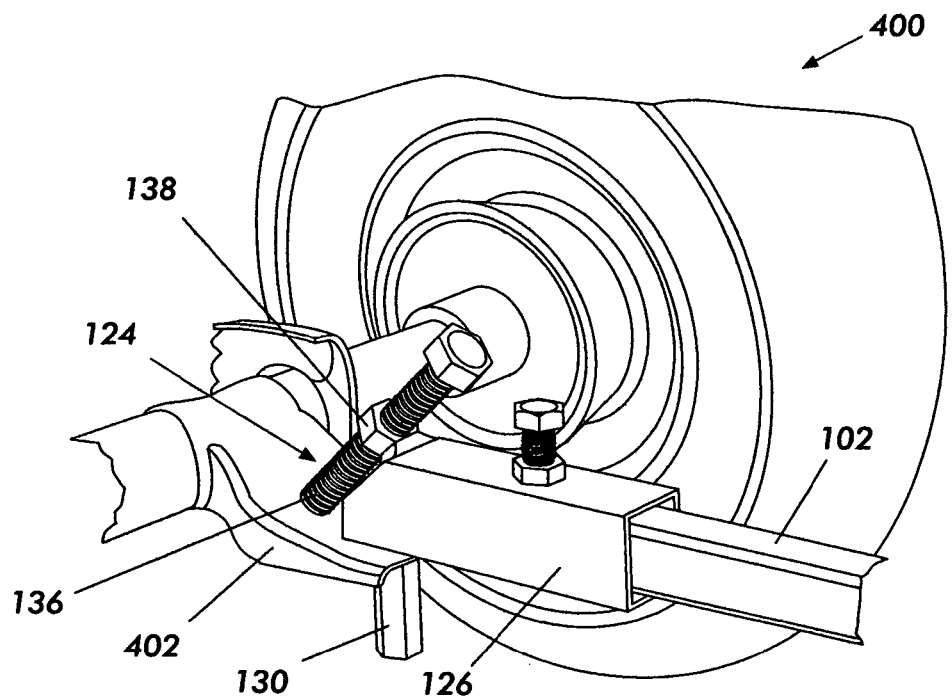
FIG. 5 is a perspective view of receiver means for attaching the apparatus of the present invention to a vehicle.

FIG. 5 shows the receiver means of FIG. 4, attached to an all-terrain vehicle. Referring to FIG. 5, all-terrain vehicle 400 comprises hitch plate 402, which further comprises a hole therethrough (obscured by receiver socket 126). Receiver stud 128 (see FIG. 4) is engaged with the hole in hitch plate 402, and receiver nut 130 is threadedly engaged with receiver stud 128, which reversibly attaches receiver socket 126 and receiver bar 102 to all-terrain vehicle 400.

In the embodiment shown in FIG. 5, receiver means 124 further comprises angle adjustment bolt 137 and guide nut 139, which is suitably joined to receiver socket 126. In operation, angle adjustment bolt 137 is threadedly engaged with guide nut 139, and is tightened against hitch plate 402 of vehicle 400. In performing such tightening, angle adjustment bolt 137 on receiver means 124 provides adjustment of the angle at which apparatus 100 is transported, with respect to vehicle 400.

In an alternative embodiment, the apparatus of the present invention may be provided with additional means to secure it to a vehicle. Referring to FIG. 1, strap 140 is looped around riser 105, through one or more bars of cargo rack 404 of vehicle 400, and joined to itself through buckle 142. Strap end 144 is tightened through buckle 142 to remove all slack from strap 140, thereby securing transportable shooting apparatus 100 more forcibly to the vehicle 400.

FIG. 1 is a side elevation view of one embodiment of the apparatus of the present invention, comprising a target dispenser. Referring to FIG. 1, target dispenser 200 is joined to platform 118 of shooting apparatus 100. In one embodiment, target-dispensing apparatus 200 is joined to platform 118 by nut-and-bolt fasteners 144, 146, and 148 of FIG. 3, wherein platform 118 and shooting apparatus 200 are shown detached from upper section 109 of riser 105, and inverted.

In one embodiment, the transportable shooting apparatus 100 of FIG. 1 is deployed for use as shown, i.e. in the same condition in which it is transported. All-terrain vehicle 400 is of sufficient weight to absorb the recoil reaction resulting from the dispensation of a target by shooting apparatus 200. However, in some situations, such as all-terrain vehicle being of light weight, or being a three-wheeled vehicle, features of the present invention that improve the stability thereof are preferred.

Figure 6:
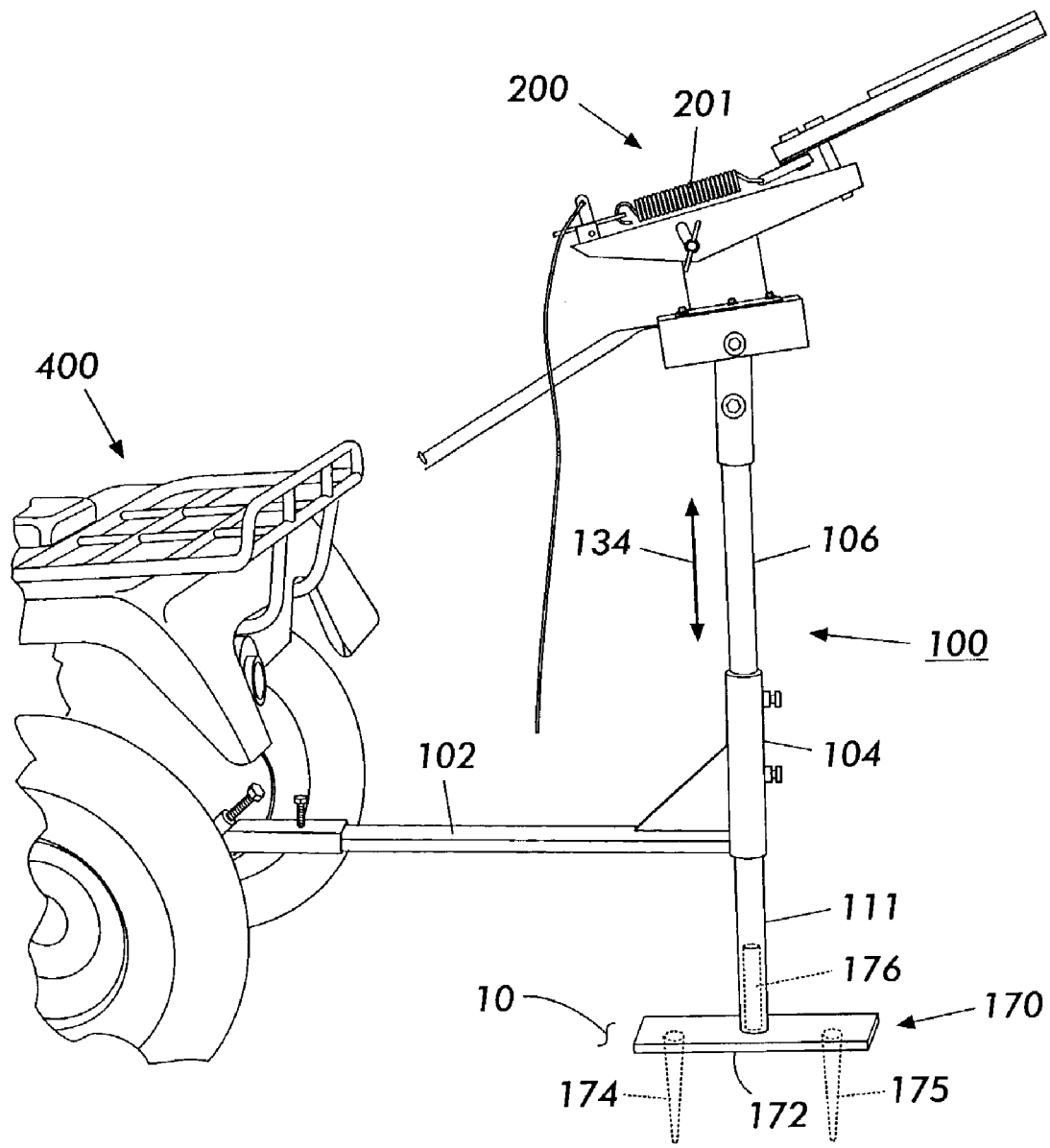
FIG. 6 is a is a side elevation view of one embodiment of the apparatus of the present invention, comprising a receiver bar, a riser, and a target dispenser, wherein the target dispenser is deployed in a more stable configuration for the dispensing of targets.

FIG. 6 is a is a side elevation view of one embodiment of the apparatus of the present invention, comprising a receiver bar, a riser, and a target dispenser, wherein the riser further comprises anchoring features such that the apparatus is deployed in a more stable configuration for the dispensing of targets. Referring to FIG. 6, apparatus 100 is deployed with the bottom end 111 of riser tube 106 lowered, as indicated by arrow 134, such that the bottom end 111 thereof is in contact with ground 10. In one alternative embodiment (not shown) bottom end 111 is provided with a point that may be embedded into the ground. Riser tube upper lock bolt 108 and lower lock bolt 110 (see FIG. 2) are tightened against riser tube 106 as described previously in this specification, to secure riser tube 106 in the deployed position.

In a preferred embodiment, apparatus 100 is provided with an anchor plate assembly 170, which is fitted to bottom end 111 of riser tube 106. Anchor plate assembly 170 comprises plate 172, to the bottom side of which are joined spikes 174 and 175 by suitable means such as e.g., welding. Anchor plate assembly 170 further comprises post 176 joined to the top side of plate 172, and substantially perpendicular to plate 172. In one embodiment, anchor plate assembly 170 was fabricated of carbon steel, with plate 172 being 0.25 inches thick, 4 inches wide, and 12 inches long; spikes 174 and 175 being 6 inches long; and post 176 being 1 inch in diameter and 3 inches long.

In use, anchor plate assembly 170 is placed in contact with ground 10 directly beneath bottom end 111 of riser tube 106, and further depressed (typically by the user's foot) such that spikes 174 and 175 (shown in phantom) are driven into ground 10. Riser tube 106 is then lowered such that post 176 is disposed within and engaged with bottom end 111 of riser tube 106. As a result of such engagement, apparatus 100 is anchored to ground 10 in a manner that resists any torque of apparatus 100 around riser 106, or around receiver stud 128 (see FIG. 4) when a target is ejected by target dispenser 200. Thus, substantially all of the potential energy that is stored in spring 201 of cocked target dispenser 200 (not shown) is converted into kinetic energy of the target (not shown) when such target is dispensed. In a further embodiment, anchor plate may be reversibly joined to bottom end 111 of riser tube 106 by suitable means such as a threaded engagement therewith (not shown), or by a pin (not shown). It is strongly preferred that any such joining is reversible so that at any time, riser tube 106 may be withdrawn completely through sleeve 104 in the event that apparatus 100 is to be dismantled.

Figure 7:
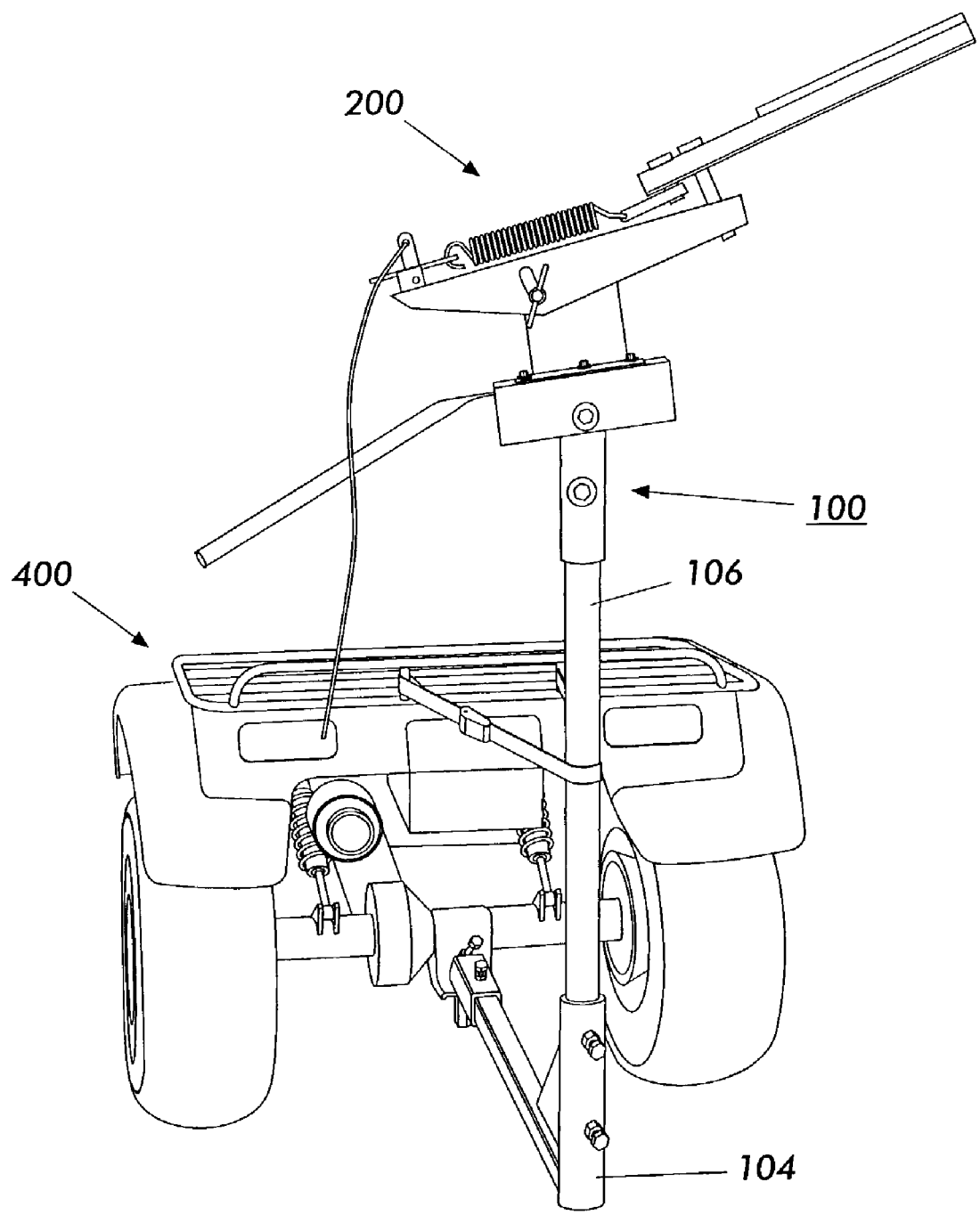
FIG. 7 is an elevation view of one embodiment of the apparatus of the present invention, comprising a receiver bar, a riser, and a target dispenser, taken in the forward direction of the vehicle.

The transportable shooting apparatus of the present invention is preferably provided with several additional features, which enable the simple adjustment of the apparatus in order to obtain optimum performance from the equipment attached thereto. For example, and referring again to FIG. 1, riser tube 106 of apparatus 100 is preferably a cylindrical tube, and riser sleeve 104 is preferably a cylindrical sleeve. Accordingly, riser tube upper locking bolt 108 and riser tube lower locking bolt 110 of FIG. 2 are loosened, and riser tube 106 is swiveled in riser sleeve 104 to a desired alternative position, whereupon riser tube upper locking bolt 108 and riser tube lower locking bolt 110 are tightened, securing the shooting apparatus in the alternative position. FIG. 7 depicts one example of the shooting apparatus 100 swiveled and secured in an alternative position.

A further adjustment feature provides for the adjustment of the angle of the platform of the shooting apparatus. In one embodiment shown in FIG. 3, upper section 109 of riser 105 is provided with toothed washer 150, which is joined to upper section 109 of riser 105 by suitable means such as welding. Toothed washer 150 is substantially concentric with stud 116, and toothed washer 150 is provided with a plurality of teeth that are substantially identical to tooth 152, around at least a portion of the circumference thereof.

Platform 118 is provided with locating pin 154 for engagement with tooth 152 and an adjacent tooth, or with other pairs of teeth, when platform 118 is secured to upper section 109 of riser 105.

The engagement of pin 154 with toothed washer 150 is therefore incrementally adjustable along an arc represented by arcuate arrow 156 of FIG. 3. Referring to FIG. 1, the position of platform 118 is correspondingly adjustable along the arc represented by arcuate arrow 156. Such adjustability of platform 118 enables the corresponding adjustment of the plane (indicated by line 160) in which targets are discharged from the target dispenser 200, through a range of positions partially indicated by arcuate arrow 158. Such adjustability is desirable to the user, because it enables the simulation of the flight trajectories of a variety of flushed game birds, from those having a substantially vertical flight path to those having a substantially horizontal flight path.

The adjustability of platform 118 by the engagement of a toothed washer with a pin is incremental as presently described, and shown in FIGS. 1 and 3. However, it will be apparent to those skilled in the art that there are many mechanisms known in the mechanical arts for providing continuous adjustability of a platform that is secured to a riser. It is to be understood, therefore, that such continuous adjustability is encompassed by the present invention.

Figure 8:
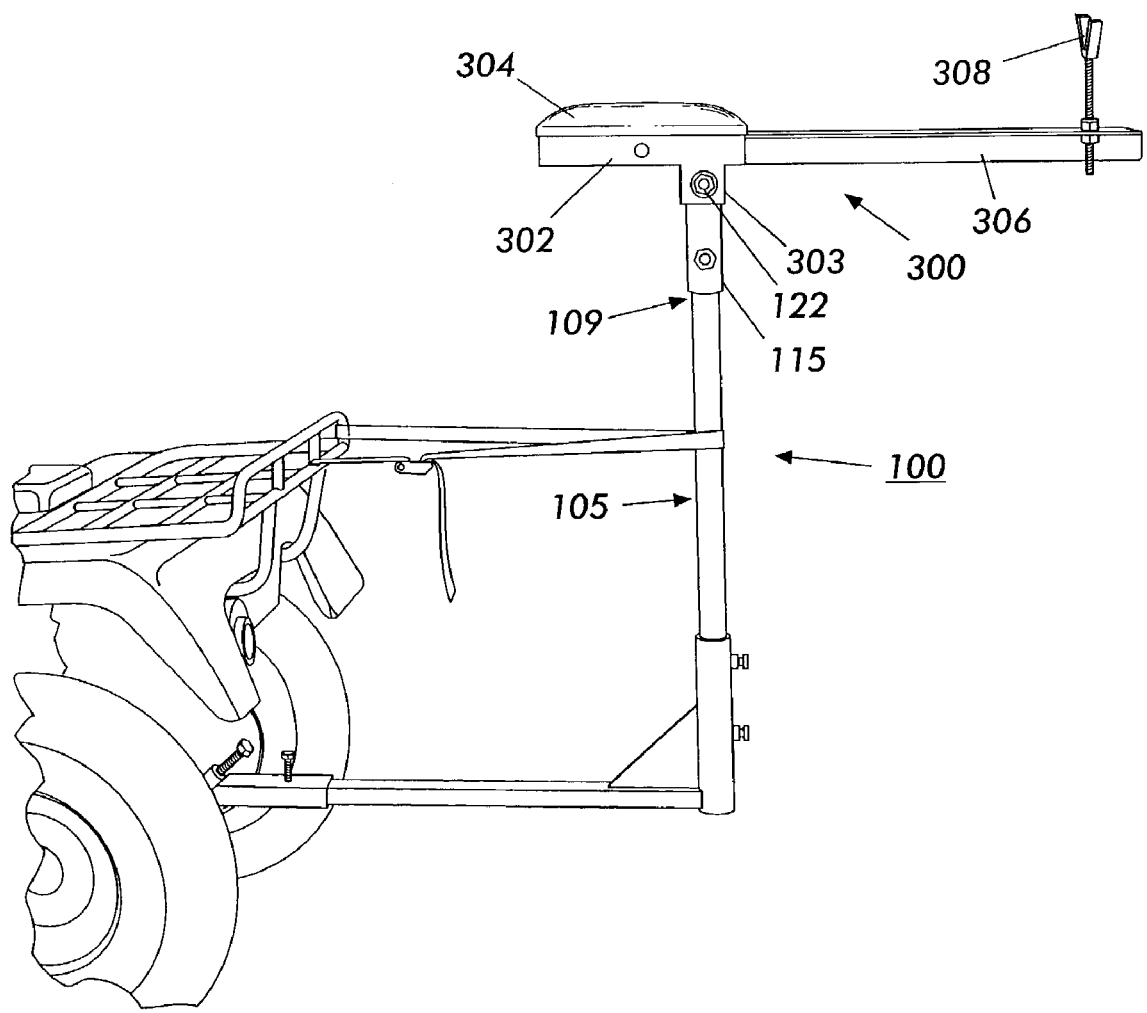
FIG. 8 is a side elevation view of another embodiment of the apparatus of the present invention, comprising a receiver bar, a riser, and a gun-sighting bench rest.

FIG. 8 is a side elevation view of another embodiment of the apparatus of the present invention, comprising a gun-sighting bench rest. Referring to FIG. 8, gun-sighting bench rest 300 of transportable shooting apparatus 100 comprises base 302, gunstock pad 304, gun barrel support bar 306, and gun barrel support V-rest 308. Base 302 further comprises mounting tab 303, through which is provided a hole (not shown), such that base 302 is secured to upper section 109 of riser 105 using nut 122, as was described for the securing of platform 118 to upper section 109, and shown in FIG. 1.

Figure 9:
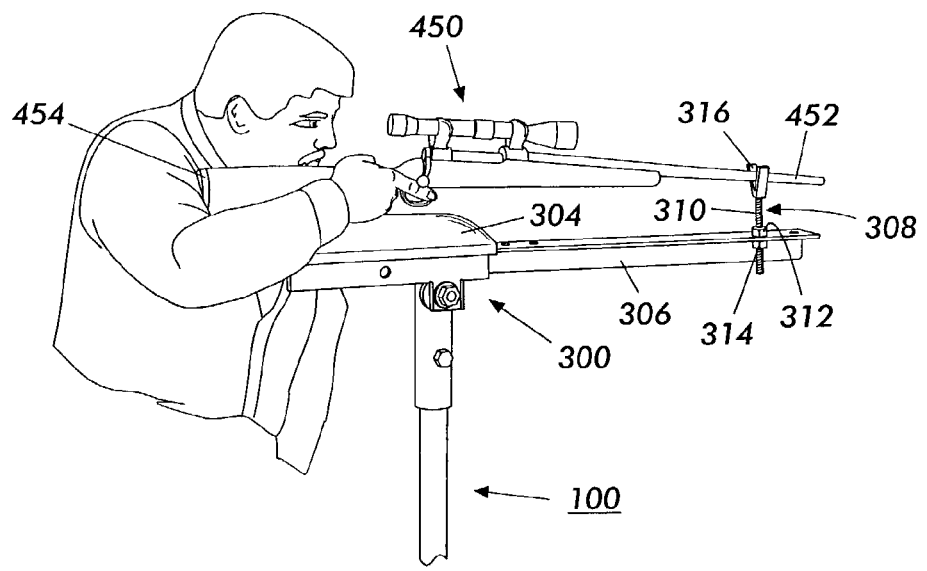
FIG. 9 is a side elevation view of the embodiment of FIG. 8, shown in use in the sighting of a long gun.

FIG. 9 is a side elevation view of the embodiment of FIG. 8, shown in use in the sighting of a long gun. Referring to FIG. 9, long gun 450 is positioned with barrel 452 resting in V-rest 308, and gunstock 454 resting on pad 304. The height of V-rest 308 is made adjustable by the provision of threaded rod 310, on which locking nuts 312 and 314 are threadedly engaged.

Figure 10:
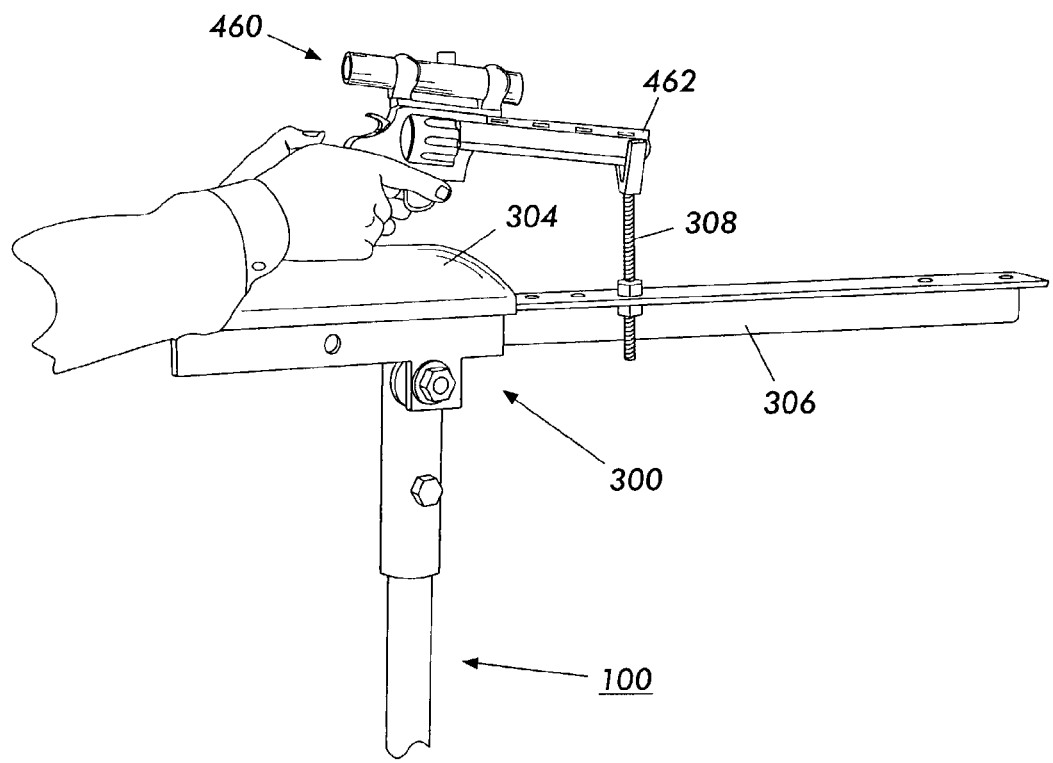
FIG. 10 is a side elevation view of the embodiment of FIG. 8, shown in use in the sighting of a sidearm.

FIG. 10 is a side elevation view of the embodiment of FIG. 8, shown in use in the sighting of a sidearm. Referring to FIG. 10; sidearm 460 is positioned with barrel 462 resting in V-rest 308, and gunstock (concealed by shooter's hands) resting on pad 304. The location of V-rest 308 upon barrel support bar 306 has been adjusted to accommodate the short length of the barrel 462 of sidearm 460. In one embodiment, the adjustability of the position of V-rest 308 upon barrel support bar 306 is provided by a series of holes (not shown) drilled along the length of barrel support bar 306. In another embodiment, the adjustability of the position of V-rest 308 upon barrel support bar 306 is provided by a slot (not shown) milled along the length of barrel support bar 306.

The structural components of the apparatus of the present invention may be made of any suitable materials of construction known in the mechanical arts. Such materials are preferably inexpensive, readily available from common industrial supply wholesalers, and sufficiently lightweight such that one person may assemble the apparatus in its various configurations. For example, the apparatus may comprise components made of steel, aluminum, plastic, composite materials such as fiber-reinforced polymer, and the like.

In the embodiment shown in FIG. 1, receiver bar 102 was made of 1.5 inch square steel tubing with a 0.25 inch wall thickness. Riser sleeve 104 was made of steel tubing 2.375 inches in outside diameter, 2.00 inches in inside diameter, and 12 inches in length. Platform knuckle sleeve 115 is made of steel tubing 2.375 inches in outside diameter, 2.00 inches in inside diameter, and 6.0 inches in length. Riser tube 106 is made of steel tubing 1.875 inches in outside diameter, 1.50 inches in inside diameter, and approximately 43.0 inches in length. Platform 118 is made of steel angle iron stock, 3.25 inches on its short side, 5.00 inches on its long side, 0.25 inches thick, and 9 inches long. Stud 116 of FIG. 3 is 0.625 inch in diameter, one inch in length, and threaded with ⅝-11 UNC threads. It is noted that 1.5 inch square steel tubing is preferred for receiver bar 102, because Class 1 receiver hitches commonly used in automotive towing applications comprise square sockets 1.5 inches in cross section. Accordingly, the embodiment of the present invention shown in FIG. 1 and described above can be attached to any vehicle comprising a Class 1 receiver hitch.

In the embodiment shown in FIG. 9, bench rest assembly 308 was made of a platform of steel angle iron stock, 3.0 inches on its short side, 4.0 inches on its long side, 0.25 inches thick, 12 inches long, and padded with vinyl-covered foam padding. Barrel support bar 306 was made of steel angle iron stock, 2.0 inches on each side, 0.125 inches thick, and approximately 24 inches long. V-rest 308 was made of V-block 316 threadedly engaged with threaded rod 310, which was made of ⅜-16 UNC threaded rod, approximately 6 inches in length.

Figure 11A:
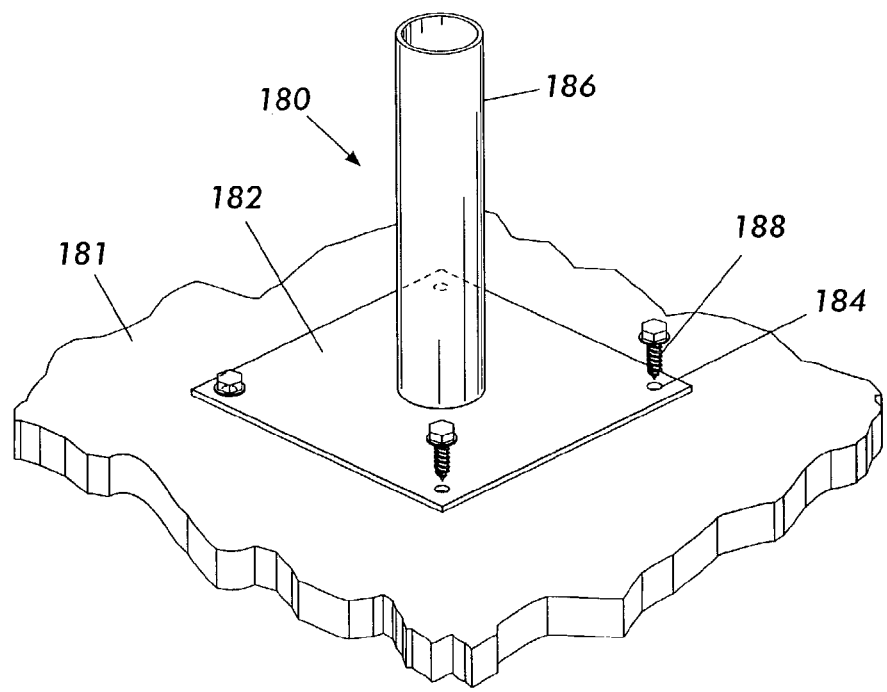
FIG. 11A is a perspective view of a platform attachment base for securing the transportable shooting apparatus to a flat surface.

In a further embodiment, the apparatus of the present invention comprises attachment base means for attachment to an immobile surface, instead of means for attachment to a vehicle. FIG. 11A is a perspective view of a platform attachment base for securing the transportable shooting apparatus to a flat and approximately horizontal surface. Referring to FIG. 11A, platform attachment base 180 comprises flat plate 182 to which is joined riser 186 by suitable means, preferably by welding. A plurality of holes 184 are provided through plate 182, such that screws 188 may be used to secure plate 182 to flat surface 181, such as e.g., a table top, a stump, and the like. Riser 186 is disposed substantially vertically and perpendicular to plate 182, and serves as an alternative mounting riser, in lieu of riser 105 of FIG. 1, to which is mounted target dispenser 200 by engagement with sleeve 115; or riser 105 of FIG. 8, to which is mounted gun-sighting bench rest 300 by engagement with sleeve 115.

Plate 182 is preferably between about 20 and 150 square inches in area and between about ⅛ inch and about ½ inch in thickness. Riser 186 is preferably between about 6 inches and 18 inches in length, with an outside diameter slightly less than the inside diameter of the corresponding sleeve 115 of apparatus 100 or apparatus 300, and with a wall thickness sufficient to rigidly hold apparatus 100 or 300 in place and absorb the recoil of a target dispensation, or a firing gun. In one preferred embodiment, platform attachment base 180 was fabricated of carbon steel, wherein plate 182 was made of a 6 inch by 6 inch by ¼ inch thick plate, and riser 186 was made of a 12 inch length of 1.5 inch Schedule 40 steel pipe.

Figure 11B:
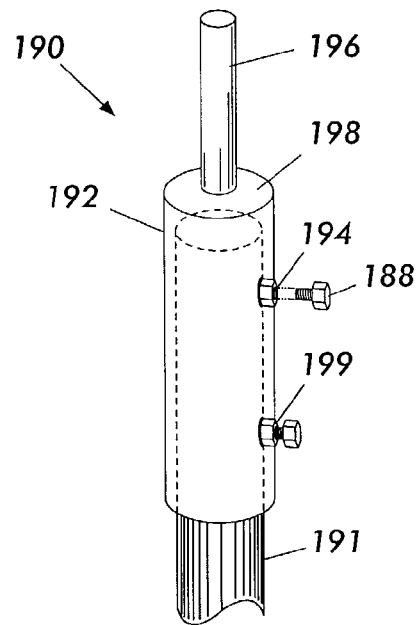
FIG. 11B is a perspective view of a tubular attachment base for securing the transportable shooting apparatus to a post.

FIG. 11B is a perspective view of a tubular attachment base for securing the transportable shooting apparatus to a post surface, such as e.g., a sawed-off tree trunk, a cylindrical post, a square post, and the like. Referring to FIG. 11B, tubular attachment base 190 comprises sleeve 192, to which is joined cap 198 and riser 196, preferably by welding. A plurality of holes 194 are provided through sleeve 192, such that screws 188 (see FIG. 11A) may be used to secure sleeve 192 to post 191. In a further embodiment, nuts 199 are welded to sleeve 192, and provided with bolts 188 such that bolts 188 are engaged with post 191, in a manner similar to that described previously in this specification. Riser 196 is substantially coaxial with sleeve 192, and serves as an alternative mounting riser, instead of riser 105 of FIG. 1, to which is mounted target dispenser 200 by engagement with sleeve 115; or riser 105 of FIG. 8, to which is mounted gun-sighting bench rest 300 by engagement with sleeve 115. It will be apparent that the dimensions of riser 196 and sleeve 115 may be chosen such that riser 196 is either a solid bar or a hollow riser tube, wherein sleeve 115 is engaged with the outer surface of riser 196, or sleeve 115 may be contained within riser 196, wherein riser 196 is a hollow tube or pipe.

In the embodiment depicted in FIG. 11B, the immobile surface is depicted as being formed by a cylindrical post 191. Alternatively, post 191 could be a square post such as a pressure-treated 4-inch by 4-inch post, and sleeve 192 could be formed of square tubing. In the following description, there is no intent to limit the scope of the invention to solely embodiments comprising a cylindrical sleeve.

Referring to FIG. 11B, and in the embodiment depicted therein, sleeve 192 is preferably between about 3 and about 7 inches in diameter, and between about 6 inches and about 12 inches in length. Generally, 3-inch, 4-inch, or 6-inch Schedule 80 steel pipe is suitable for fabrication of sleeve 192. Suitable materials and dimensions for riser 196 are as recited for riser 186 of FIG. 11A. In one preferred embodiment, tubular attachment base 190 was fabricated of carbon steel, wherein sleeve 192 was made of 4-inch Schedule 40 pipe 8 inches in length, cap 192 was made of ¼ inch thick steel plate, and riser 192 was fabricated as recited for riser 182 of FIG. 11A.

In recapitulation, the present invention is an apparatus, which can be secured to a vehicle, and which can be used to affix, transport, and deploy shooting sports equipment such as a target dispenser, a gun-sighting bench rest assembly, and the like. While this invention has been described in conjunction with preferred embodiments thereof, it is evident that many alternatives, modifications, and variations will be apparent to those skilled in the art. Accordingly, it is intended to embrace all such alternatives, modifications and variations that fall within the spirit and broad scope of the appended claims.

The invention claimed is:

1. An apparatus for affixing, transporting, and deploying shooting sports equipment with a vehicle, comprising:
   a. a receiver bar having a first end and a second end, said first end being attachable to a vehicle;
   b. a riser comprising a lower section and an upper section, said riser being attachable at said lower section to said second end of said receiver bar, and said riser further comprising a washer joined to said upper section, and a threaded stud joined to said upper section and extending outwardly through said washer, said washer comprising a plurality of teeth formed around at least a portion of the perimeter of said washer, and
   c. a platform comprising a first section disposed vertically and including a hole therethrough and a pin protruding outwardly therefrom, and a second section, wherein said threaded stud of said riser passes through said hole, said washer is contiguous with a surface of said first section of said platform, said platform is secured to said riser by a nut engaged with said threaded stud of said riser, and said pin protruding outwardly from said first section is engageable between any adjacent pair of said teeth of said washer.

2. The apparatus as recited in claim 1, further comprising a target dispenser attached to said second section of said platform.

3. The apparatus as recited in claim 1, wherein said receiver bar comprises a vertically disposed sleeve joined to said second end thereof, and said lower section of said riser is disposed within said sleeve.

4. The apparatus as recited in claim 3, wherein said lower section of said riser comprises a pointed end.

5. The apparatus as recited in claim 3, wherein an anchor plate assembly comprising a plate and at least one spike protruding downwardly from said plate is engaged with said lower section of said riser.

6. The apparatus as recited in claim 1, further comprising a receiver socket that is engageable with said first end of said receiver bar.

7. The apparatus as recited in claim 1, wherein said apparatus further comprises a bench rest.

8. The apparatus as recited in claim 7, wherein said bench rest further comprises a base joined to said riser and a support bar joined to said base.

9. The apparatus as recited in claim 8, wherein said bench rest further comprises a pad disposed upon said base, and a V-rest joined to said support bar.

10. The apparatus as recited in claim 6, wherein said receiver socket further comprises a receiver stud joined thereto, and a nut threadedly engaged with said receiver stud.

* * * * *